(12) United States Patent
Hamilton, Jr.

(10) Patent No.: US 12,470,051 B2
(45) Date of Patent: Nov. 11, 2025

(54) JUNCTION BOX ASSEMBLY WITH RECESSED KEY FEATURES

(71) Applicant: Sumitomo Wiring Systems, Ltd., Yokkaichi (JP)

(72) Inventor: Kyles O. Hamilton, Jr., Farmington Hills, MI (US)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 301 days.

(21) Appl. No.: 18/193,031

(22) Filed: Mar. 30, 2023

(65) Prior Publication Data
US 2024/0332934 A1    Oct. 3, 2024

(51) Int. Cl.
*H02G 3/08* (2006.01)
*H02G 3/16* (2006.01)

(52) U.S. Cl.
CPC ..................... *H02G 3/16* (2013.01)

(58) Field of Classification Search
CPC .......... H02G 3/08; H02G 3/081; H02G 3/083; H02G 3/16; H02G 3/088; H02G 3/086; H05K 5/00; H05K 5/02; B60R 16/0239; B60R 16/02; B60R 16/005
USPC ....................... 174/50, 53, 57, 59, 559, 520; 220/3.2–3.9, 4.02; 361/600, 601, 626; 439/76.1, 76.2, 949, 761
See application file for complete search history.

(56) References Cited

U.S. PATENT DOCUMENTS

| | | | | |
|---|---|---|---|---|
| 7,723,608 B2* | 5/2010 | Higashikozono | .... | H01R 9/2425 174/50 |
| 7,893,364 B2* | 2/2011 | Oda | ...................... | H05K 7/026 439/949 |
| 8,395,061 B2* | 3/2013 | Asao | ........................ | H02G 3/16 174/549 |
| 8,408,922 B2* | 4/2013 | Yamamoto | ............. | H01R 13/41 439/949 |
| 8,714,997 B2* | 5/2014 | Ikeda | ..................... | H01R 4/242 439/76.2 |
| 8,876,537 B2* | 11/2014 | Katsuse | ................. | H01R 13/73 439/701 |
| 9,873,392 B2* | 1/2018 | Matsumura | .............. | H02G 3/16 |
| 10,944,247 B2* | 3/2021 | Aichi | ................. | H01H 85/2045 |
| 11,145,926 B2* | 10/2021 | Kim | .................... | H01M 50/262 |

(Continued)

FOREIGN PATENT DOCUMENTS

JP      2012191711 A    10/2012
JP      2016174504 A    9/2016

*Primary Examiner* — Angel R Estrada
(74) *Attorney, Agent, or Firm* — Honigman, LLP; John Chau (57) ABSTRACT

A junction box is dimensioned to accommodate electronic components, and receives a plurality of terminals, including a distal end shaped differently from each other. The junction box includes an outer wall and a bottom wall. The outer wall extends upwardly from a peripheral edge of the bottom wall. The bottom wall and the outer wall are dimensioned to form a plurality of recesses spaced apart from each other and forming a key feature that corresponds in shape to one of the plurality of terminals. As such, each of the plurality of terminals are designed to be seated within a predetermined key feature. Further, as the key features are recessed with respect to the outer wall, the key features are protected from damage as a result of an accidental drop or during shipment.

16 Claims, 7 Drawing Sheets

(56) References Cited

U.S. PATENT DOCUMENTS 11,955,786 B2 * 4/2024 Isaji .................. H02G 3/14
12,191,648 B2 * 1/2025 Shiraki ............... H02G 3/16

* cited by examiner

JUNCTION BOX ASSEMBLY WITH RECESSED KEY FEATURES

TECHNICAL FIELD

The present specification generally relates to junction box assemblies and, more particularly, junction box assemblies with recessed key features for accommodating eyelet terminals in a predetermined manner.

BACKGROUND

Figure 1:
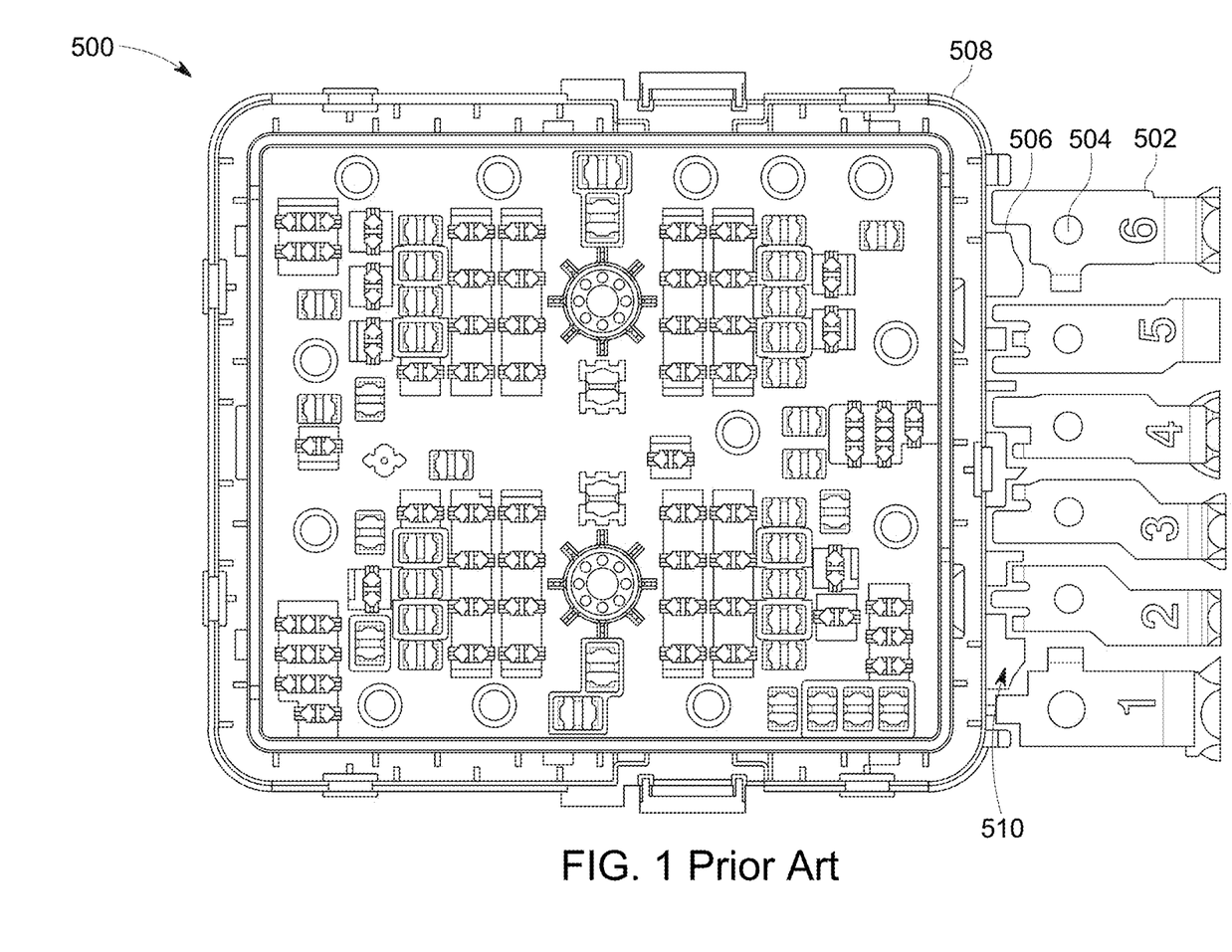
FIG. 1. is a top-down view of a conventional junction box assembly.

A depiction of a conventional junction box assembly 500 is shown in FIG. 1. In general, conventional junction box assemblies 500 include eyelet terminals 502 coupled to the eyelet posts 504. The eyelet terminals 502 provide an electrical connection to provide power to electric devices (not shown) and are configured to link the electric devices to a power source (not shown). For instance, the junction box assembly 500 may be used in an automotive vehicle to distribute power to one or more components, such as windshield wipers, fans for the HVAC system, mirrors, or the like.

In some instances, the junction box assembly 500 includes at least two different power sources for powering different electric devices. For example, it may be desirable to have one power source be 12-volts while another power source is 48-volts. Such a configuration may be desirable in automotive vehicles configured to power electric devices having different load demands. For instance, the 12-volt power source may be used to power conventional electric devices such as windshield wipers, fans, or the like, whereas the 48-volt power source may be used to power an electric motor configured to drive the automotive vehicle. The power sources are coupled to the electric devices vis-à-vis the eyelet terminal 502 and a busbar (not shown).

Due to packaging and manufacturing considerations, it is often desirable to have eyelet terminals 502 for the different power sources positioned adjacent to each other. In addition, the eyelet terminals 502 are configured to mount to a specific eyelet post 504 to ensure that the proper circuit is provided for the electric device that is ultimately coupled to the eyelet terminal 502. To ensure the proper eyelet terminal 502 is mounted to the proper eyelet post 504, conventional junction box assemblies 500 include protrusions 506, which protrude outwardly from an outer wall 508 of the junction box assembly 500. The protrusions 506 are spaced apart from each other to form key features 510. However, the protruding key features 510 may be broken when the junction box assembly 500 is dropped and thus requires protective packaging during shipment.

Accordingly, it remains desirable to have junction box assemblies having key features which are not subject to damage when the junction box assemblies are accidentally dropped or damaged during shipment.

SUMMARY

In one embodiment, a junction box is provided. The junction box is dimensioned to accommodate electronic components, and receive a plurality of terminals. Each terminal includes a distal end shaped differently from the other. The junction box includes an outer wall bounding a space for accommodating the electronic components and a bottom wall. The outer wall extends upwardly from a peripheral edge of the bottom wall. The bottom wall and the outer wall are dimensioned to form a plurality of recesses. Each of the plurality of recesses are spaced apart from each other and form a plurality of key features which are different from each other and correspond in shape to one of the plurality of terminals. As such, each of the plurality of terminals are designed to be seated within a predetermined key feature. Further, as the key features are recessed with respect to the outer wall, the key features are protected from damage as a result of an accidental drop or during shipment.

In one embodiment of the junction box, at least one of the key features has a width different than the other of the plurality of key features.

In one embodiment, the plurality of separating walls includes a pair of separating walls disposed on the ends of the outer wall, and a plurality of intermediate separating walls disposed between the pair of end separating walls, wherein a width of the pair of separating walls is greater than a width of the separating walls.

In one embodiment, each of the plurality of key features may be disposed between a pair of the plurality of separating walls, and each of the plurality of separating walls may include a terminal end. The terminal end of each of the plurality of separating walls being coplanar with each other. In such an embodiment, each of the plurality of separating walls includes a terminal end, the terminal end of each of the plurality of separating walls being coplanar with each other. In such an embodiment, the junction box includes a lower case having a terminal support portion including a plurality of openings, each of the plurality of openings disposed within a corresponding key features in a position differently than the other.

In another aspect of the disclosure, a junction box assembly is provided. The junction box assembly is configured to accommodate electronic components. The junction box assembly includes a plurality of terminals, each of the plurality of terminals having a distal end shaped differently from each other. The junction box assembly further includes an upper case having an outer wall and a bottom wall, the outer wall and the bottom wall bounding a space for accommodating the electronic components. The outer wall extends upwardly from a peripheral edge of the bottom wall. The bottom wall and the outer wall are dimensioned to form a plurality of recesses. Each of the plurality of recesses is spaced apart from the other and forms a plurality of key features which are different from each other and correspond in shape to one of the plurality of terminals.

In one embodiment of the junction box assembly, at least one of the key features has a width different than the other of the plurality of key features.

In one embodiment, the plurality of separating walls includes a pair of separating walls disposed on the ends of the outer wall, and a plurality of intermediate separating walls disposed between the pair of end separating walls, wherein a width of the pair of separating walls is greater than a width of the separating walls.

In one embodiment, each of the plurality of key features may be disposed between a pair of the plurality of separating walls, and each of the plurality of separating walls may include a terminal end. The terminal end of each of the plurality of separating walls being coplanar with each other. In such an embodiment, each of the plurality of separating walls includes a terminal end, the terminal end of each of the plurality of separating walls being coplanar with each other. In such an embodiment, the junction box includes a lower case having a terminal support portion including a plurality of openings, each of the plurality of openings disposed within a corresponding key features in a position differently than the other.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION OF PREFERRED EMBODIMENTS

Reference will now be made in detail to embodiments of a junction box assembly and a junction box having key features resistant to being broken from being dropped or damaged during shipping.

In one embodiment, the junction box is dimensioned to accommodate electronic components, and receive a plurality of terminals. Each terminal includes a distal end shaped differently from the other. The junction box includes an outer wall bounding a space for accommodating the electronic components and a bottom wall. The outer wall extends upwardly from a peripheral edge of the bottom wall. The bottom wall and the outer wall are dimensioned to form a plurality of recesses. Each of the plurality of recesses are spaced apart from each other and form a plurality of key features which are different from each other and correspond in shape to one of the plurality of terminals. As such, each of the plurality of terminals are designed to be seated within a predetermined key feature. Further, as the key features are recessed with respect to the outer wall, the key features are protected from damage as a result of an accidental drop or during shipment.

Directional terms as used herein—for example "up", "down", "right", "left", "front", "back", "top", "bottom"—are made only with reference to the figures as drawn and are not intended to imply absolute orientation. As such, terms such as "upper", "lower", "height" and "width" are taken in context of the directional terms and the drawings.

Figure 2:
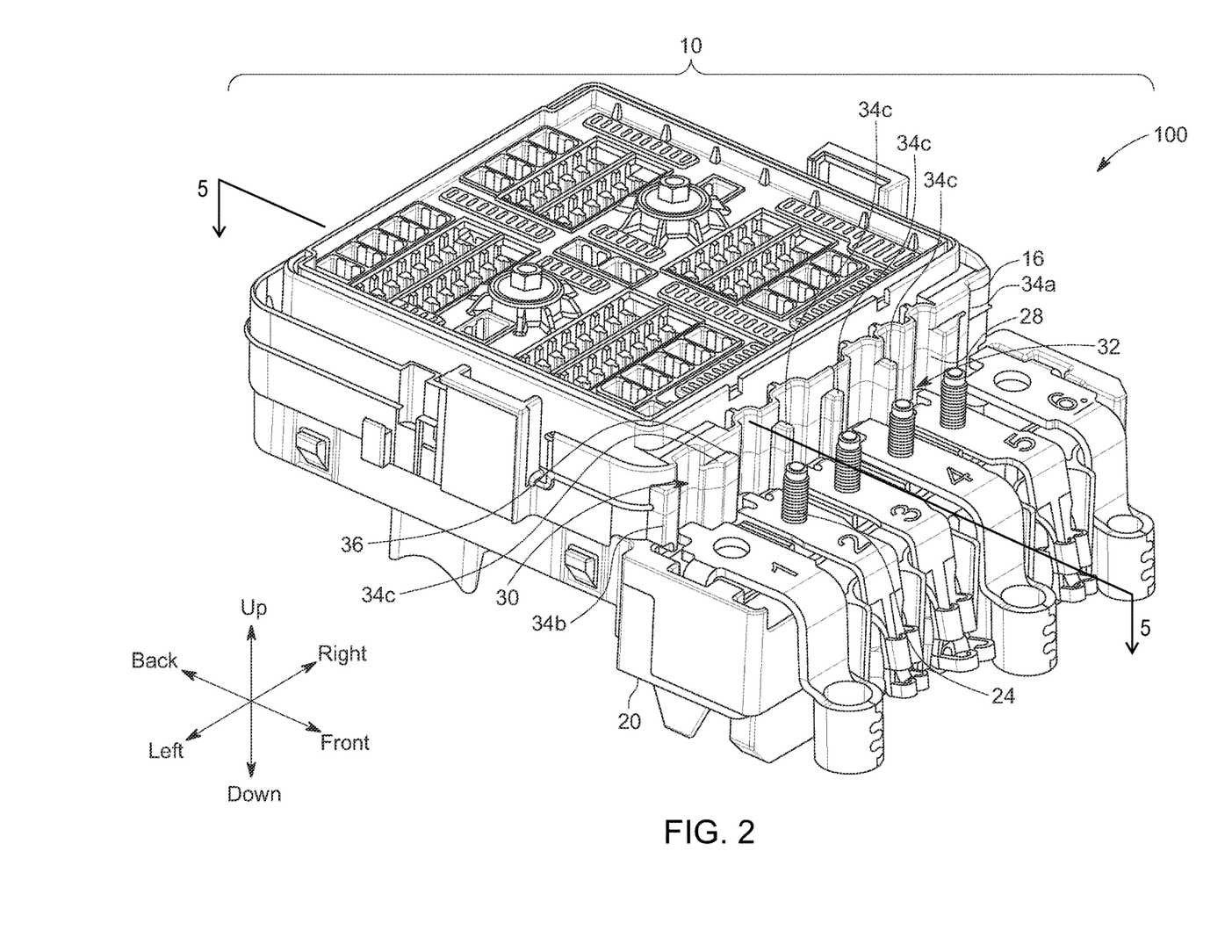
FIG. 2 is a perspective view of the junction box assembly according to one or more aspects described herein.
Figure 3:
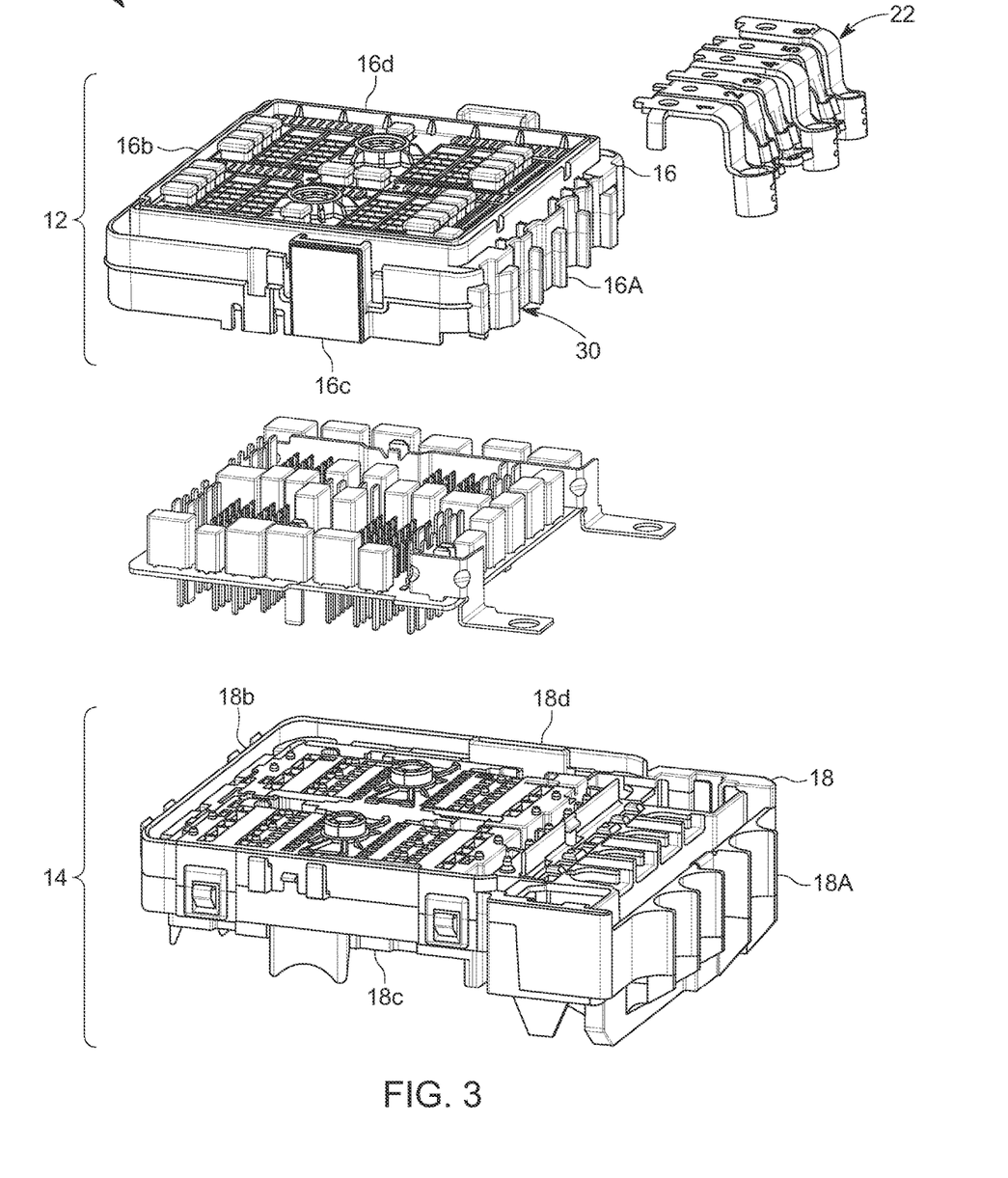
FIG. 3 is an exploded view of the junction box assembly shown in FIG. 2.
Figure 4:
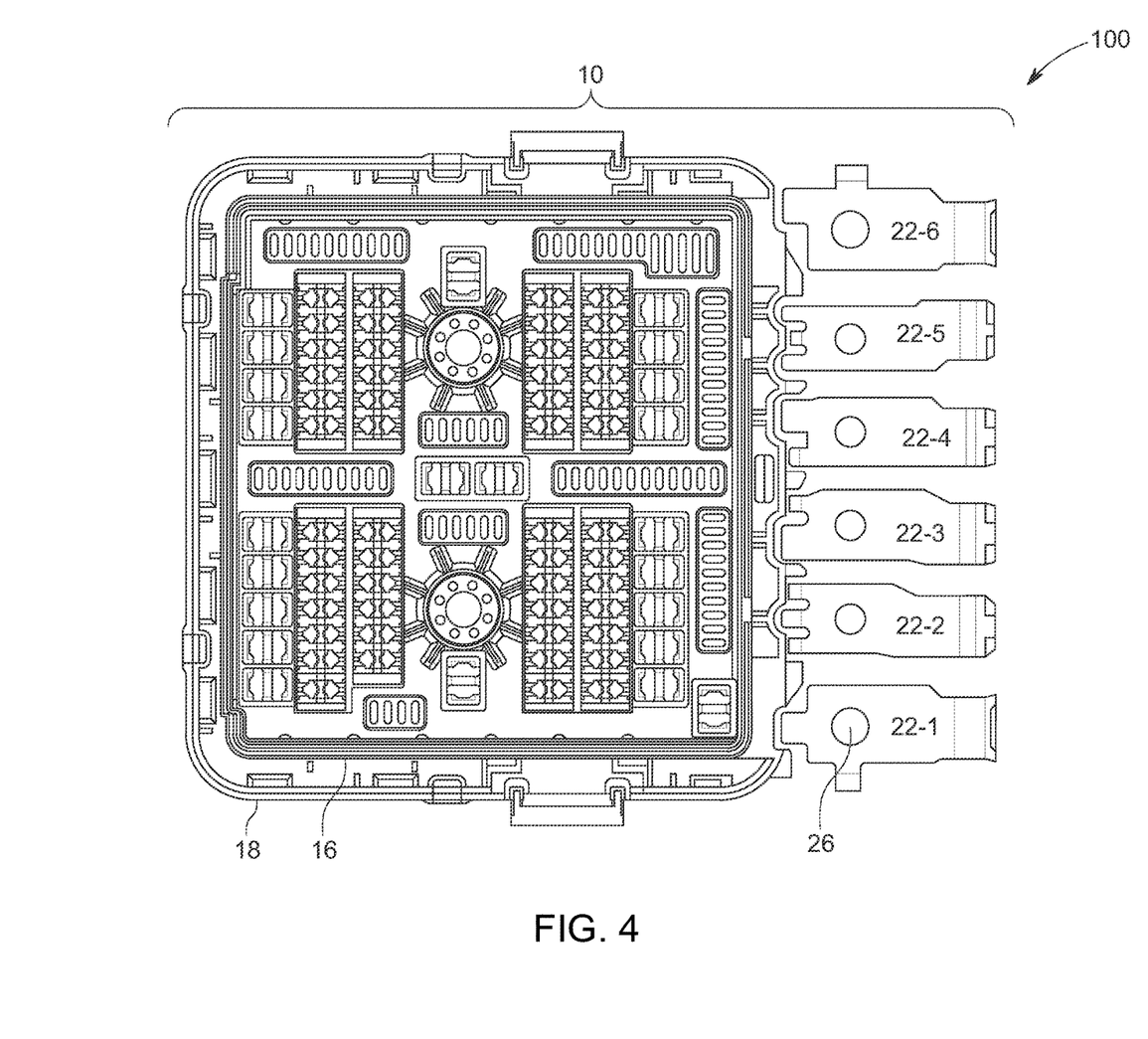
FIG. 4 is top-down view of the junction box shown in FIG. 2.

With reference now to FIGS. 2-4, an illustrative embodiment of a junction box assembly 100 is provided. The junction box assembly 100 includes a junction box 10 configured to house a plurality of electronic components mounted on a circuit board, such as switches, fuses, bus bars, electrical wires, and the like. The junction box 10 may be formed of a non-conductive material suitable for injection molding, such as polypropylene. The junction box 10 may include an upper case 12 releasably coupled to a lower case 14 using conventional snap-fit engagement mechanisms, mechanical fastening mechanisms, magnetic fastening mechanisms, or any other fastening mechanisms currently known or later developed. The upper case 12 and the lower case 14 are shown as having a generally rectangular box-shaped dimension, wherein the upper case 12 has a greater surface area, e.g., bounds a larger space than the lower case 14. In an embodiment, the upper case 12 and the lower case 14 may be any geometric shape depending on the electrical components being housed within the junction box 10 or the space in which junction box assembly 100 is being installed.

Figure 5:
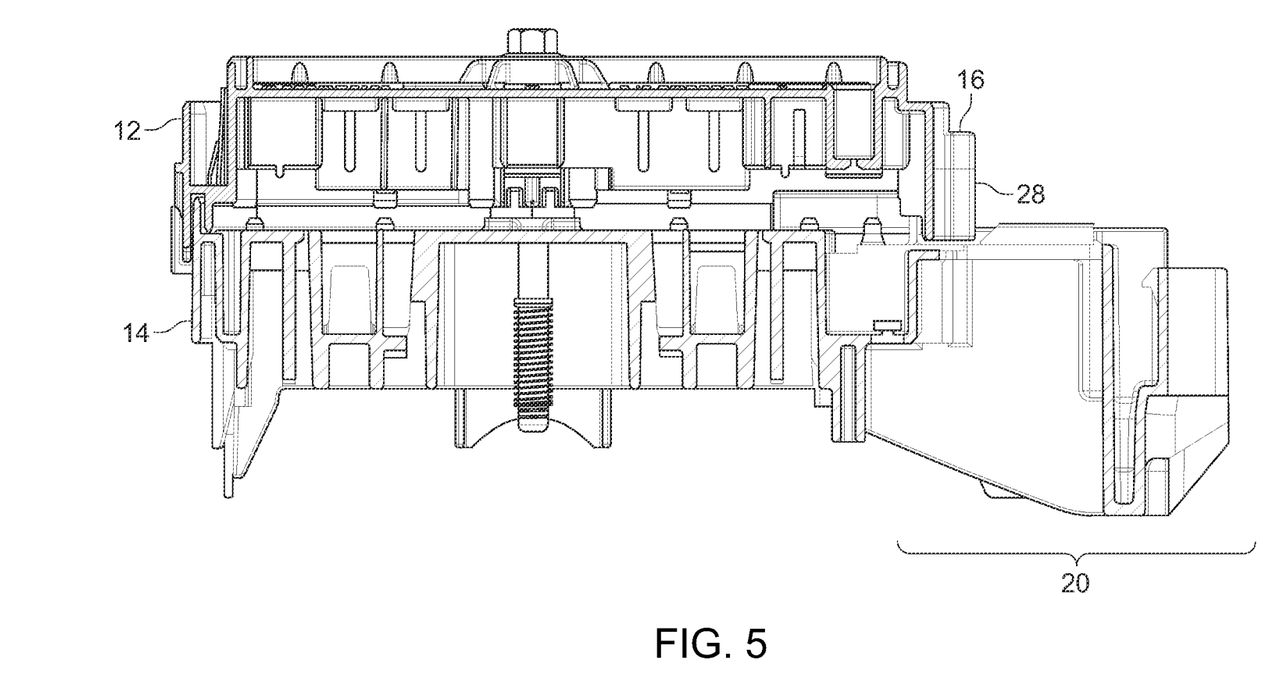
FIG. 5 is a cross-sectional view of FIG. 2 taken along line 5-5.

With reference now to FIGS. 2, 3, and 5, the upper case 12 includes an upper outer wall 16 bounding a periphery of the upper case 12 defining an upper front wall portion 16a, an upper back wall portion 16b, and a pair of upper side wall portions 16c, 16d extending between the upper front wall portion 16a and the upper back wall portion 16b.

The lower case 14 includes a lower outer wall 18 bounding a periphery of the lower case 14 so as to define a lower front wall portion 18a, a lower back wall portion 18b, and a pair of lower side wall portions 18c, 18d extending between the lower front wall portion 18a and the lower back wall portion 18b. One or more attachment features may be formed on the upper outer wall 16 and the lower outer wall 18 for attachment with an upper and lower cover (not shown) configured to protect the contents of the junction box 10 from the environment.

The lower case 14 includes a terminal support portion 20 which is configured to support a plurality of terminals 22. Preferably, terminal posts 24, such as a threaded stud, are mounted onto the terminal support portion 20. For illustrative purposes, the terminal support portion 20 is shown disposed on a front wall portion 18a of the lower case 14, but it should be appreciated that the terminal support portion 20 may be disposed on any one or more of the lower back wall portion 18b and the pair of lower side wall portions 18c, 18d. Naturally, the structures associated with the terminal support portion 20 would be adjusted likewise.

With reference now to FIGS. 2-4, and 7, the junction box assembly 100 further includes a plurality of terminals 22. The terminals 22 are plate-shaped electrically conductive members electrically couple wires which are electrically coupled to an electric device (not shown) such as windshield wipers, door locks and the like. For illustrative purposes, the junction box 10 is shown as including six (6) terminals 22-1, 22-2, 22-3, 22-4, 22-5, and 22-6. As used herein, reference number 22 refers to terminals in general, and reference numbers 22-1, 22-2, 22-3, 22-4, 22-5, and 22-6 refer to a specific terminal. However, it should be appreciated that the number of terminals 22 shown are provided for illustrative purposes only and are not limiting to the scope of the appended claims.

Figure 6:
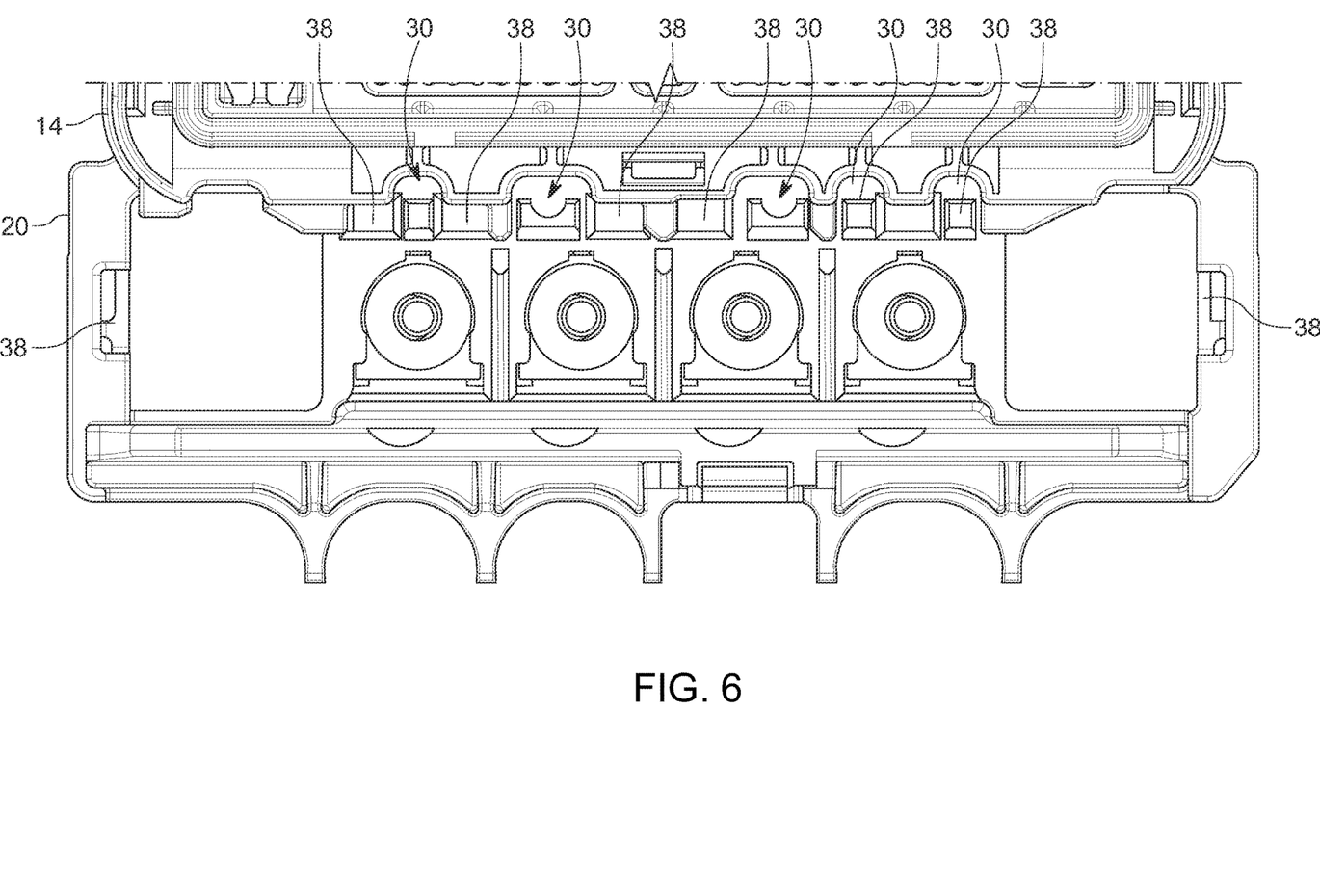
FIG. 6 is an isolated partial view of the key features shown in FIGS. 2 and 3 without the eyelet terminals.

With reference again to FIGS. 2-4, and 7, and now to FIG. 6, the terminals 22 include a main body portion 22a and a protrusion 22b which forms a distal end of the main body portion 22a. The protrusion 22b is narrower in width relative to the main body portion 22a. Preferably each distal end, e.g., protrusion 22b, of a terminal 22 is shaped differently from the other. Each terminal 22 may include a post hole 26 extending through the terminal 22 adjacent the distal end. The distal end of each terminal 22 may include one or more fingers 22c which extend downwardly from the distal end.

The post holes 26 are configured to receive a corresponding terminal post 24. For illustrative purposes, the distal end of the terminal 22-1 is a singular elongated protrusion 22b, and the finger 22c is disposed on a left side of the main body portion 22a. Terminal 22-2 includes three (3) protrusions 22b separated from each other by a slit, and the center protrusion 22b is longer than the other protrusions 22b (the end protrusions 22b), which are disposed on opposite sides of the center protrusion 22b. The end protrusions 22b include fingers 22c, which extend downwardly. Terminal 22-3 includes two protrusions 22b of different widths, wherein the left protrusion 22b is wider than the right protrusion 22b and extends further towards the back of the junction box 10 relative to the right protrusion 22b. The right protrusion 22b includes a finger 22c which extends downwardly. Terminal 22-4 includes two protrusions 22b of different widths, wherein the right protrusion 22b is wider than the left protrusion 22b and extends further towards the back of the junction box 10 relative to the left protrusion 22b. The left protrusion 22b includes a finger 22c which extends downwardly. Terminal 22-5 includes three protrusions 22b, wherein the center protrusion 22b is shorter than the other two protrusions 22b (i.e., the end protrusions 22b) and the end protrusions 22b each includes a finger 22c which projects downwardly. Terminal 22-6 is a singular elongated protrusion 22b, and the finger 22c is disposed on a right side of the main body portion 22a.

With reference now to FIGS. 2, 3, 5, and 7, the upper outer wall 16 may be integrally formed to a bottom wall 28 of the upper case 12 and extends upwardly from a peripheral edge of the bottom wall 28. The bottom wall 28 and the upper outer wall 16 are dimensioned to form a plurality of recesses 30 which are generally arcuate in shape. Each of the plurality of recesses 30 are spaced apart from each other and form a plurality of key features 32. The key features 32 are shaped differently from each other and correspond in shape to accommodate one of the plurality of terminals 22. As such, each of the plurality of terminals 22 are designed to be seated within a predetermined key feature 32 that corresponds in shape to a respective terminal 22.

Further, as the key features 32 are recessed with respect to the upper outer wall 16, the key features 32 are protected from damage as a result of an accidental drop or during shipment. For illustrative purposes, the junction box 10 is shown as having six (6) key features 32-1, 32-2, 32-3, 32-4, 32-5, and 32-6. As used herein, reference number 32 refers to key features in general, and reference numbers 32-1, 32-2, 32-3, 32-4, 32-5, and 32-6 refer to a key feature. Each key feature 32 is defined by a shape that is generally constant with respect to a width and height of the key feature 32. Thus, installation of the terminals 22 is done by placing the terminal 22 at an upper portion of the key feature 32 and sliding the terminal 22 down onto the lower case 14. Preferably, at least one of the key features 32 has a width different than the other of the plurality of key features 32. Such a configuration helps an assembly worker install the correct terminal 22 onto the corresponding key feature 32.

The junction box assembly 100 may further include a plurality of separating walls 34. The separating walls 34 may be integrally formed to the upper outer wall 16 and protrude from the outer surface of the upper outer wall 16. The separating walls 34 cooperate with a respective recess 30 to define the key feature 32 and extend along a predetermined length of the upper outer wall 16 so as to define a height. Accordingly, the key features 32 have a height that defines a path of insertion for a respective terminal 22.

For illustrative purposes, each separating wall 34 is shown as being generally equal in height but have a shape, taken along cross-sectional width, that is different from each other. The separating walls 34 includes a pair of end separating walls 34a, 34b disposed on the ends of the upper outer wall 16 and a plurality of intermediate separating walls 34c disposed between the pair of end separating walls 34a, 34b, wherein a width of the pair of end separating walls 34a, 34b is greater than a width of at least one of the intermediate separating walls 34c. Preferably, the separating walls 34 are also injection molded so as to be a generally elongated structure with solid mass and may be monolithically formed with the upper outer wall 16. Thus, in the event the upper case 12 is accidentally dropped on a separating wall 34, the separating wall 34 is not prone to damage.

In one aspect, each of the key features 32 may be disposed between a pair of separating walls 34, and each of the separating walls 34 may include a terminal end 36. The terminal end 36 of each separating wall 34 may be generally coplanar with each other so as to have the same height.

Figure 7:
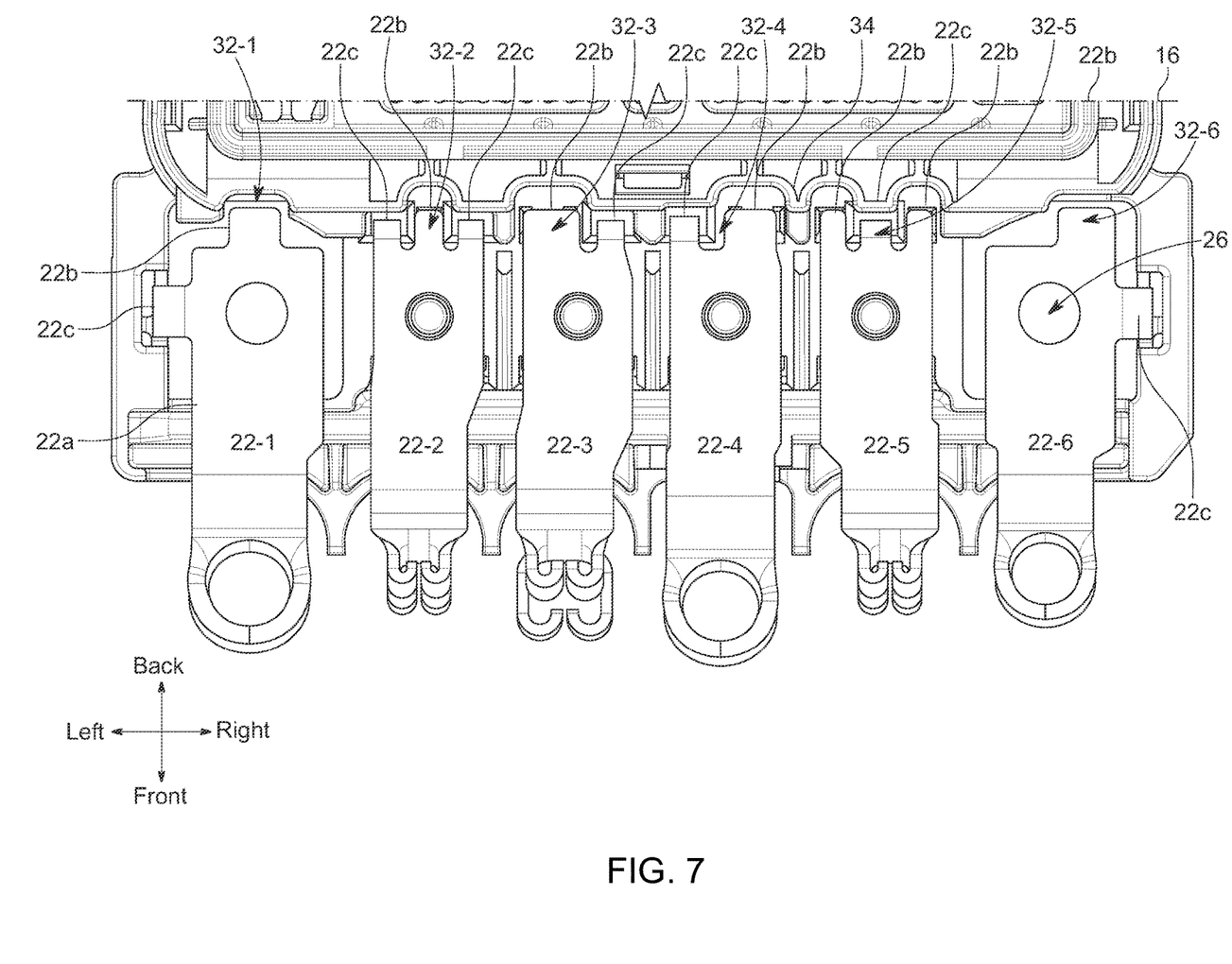
FIG. 7 is a top-down view of FIG. 6 showing the eyelet terminals.

With reference now to FIGS. 6 and 7, the terminal support portion 20 of the lower case 14 may further include a plurality of openings 38. Each of the plurality of openings 38 is disposed within a corresponding key feature 32 in a position different than the other. The openings 38 may be different shapes and sizes so as to prevent insertion of an improper terminal 22. For instance, terminal 22-3 is not able to be inserted into key feature 32-4 due to opening 38 being a different shape and size than key feature 32-4. In particular, the openings 38 work in concert with the key features 32 to allow the terminals 22 to be inserted in a corresponding portion of the terminal support portion 20. For example, terminal 22-2 cannot be seated in the key feature 32-1 designed to accommodate terminal 32-1 as the shape of the protrusion 22b, and the fingers 22c prevent terminal 22-2 from being flush against the terminal support portion 20.

In operation, the junction box assembly 100 is delivered to the manufacturer for installation into a product. For illustrative purposes, assume the junction box assembly 100 is used in an automotive vehicle. The automotive vehicle includes two different power sources (not shown) having separate terminals 22 connected to different electric devices, which require different power needs. The key features 32 work in concert with the distal ends of the terminals 22 to ensure that the terminals 22 are assembled properly to prevent improper power delivery to electric devices that would damage or otherwise prevent electric devices from functioning properly. In other words, terminal 22-2 can only fit in key feature 32-2.

Further, the key features 32 are recessed within the upper outer wall 16 of the junction box 10 and thus are not susceptible to damage when dropped. As discussed, conventional key features are elongated members which project outwardly from the outer wall and thus require additional packaging to protect the key features from damage during shipping. As the key features 32 of the present disclosure are recessed, such additional packaging is not required during shipment.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

I claim:

1. A junction box for accommodating electronic components and receiving a plurality of terminals, each of the plurality of terminals having a distal end shaped differently from each other, the junction box comprising:
   a bottom wall;
   a plurality of separating walls and a plurality of eyelet posts, each of the plurality of separating walls is taller than each of the plurality of the eyelet posts; and an outer wall bounding a space for accommodating the electronic components, the outer wall extending upwardly from a peripheral edge of the bottom wall, wherein the bottom wall and the outer wall are dimensioned to form a plurality of recesses, each of the plurality of recesses being spaced apart from each other and form a plurality of key features which are different from each other and correspond in shape to one of the plurality of terminals, and wherein the plurality of separating walls includes a pair of end separating walls disposed on the ends of the outer wall and a plurality of intermediate separating walls disposed between the pair of end separating walls, wherein a width of the pair of end separating walls is greater than a width of the intermediate separating walls.

2. The junction box as set forth in claim 1, wherein each of the plurality of key features is shaped to receive the distal end of a corresponding one of the plurality of terminals.

3. The junction box as set forth in claim 1, wherein each of the plurality of separating walls separates the plurality of key features from each other.

4. The junction box as set forth in claim 1, wherein at least one of the plurality of separating walls has a dimension different than the other of the plurality of separating walls.

5. The junction box as set forth in claim 1, wherein at least one of the key features has a width different than the other of the plurality of key features.

6. The junction box as set forth in claim 1, wherein each of the plurality of key features is disposed between a pair of the plurality of separating walls.

7. The junction box as set forth in claim 1, wherein each of the plurality of separating walls includes a terminal end, the terminal end of each of the plurality of separating walls being coplanar with each other.

8. The junction box assembly as set forth in claim 1, wherein the junction box includes a lower case having a terminal support portion including a plurality of openings, each of the plurality of openings disposed within a corresponding key features in a position differently than the other.

9. A junction box assembly for accommodating electronic components, the junction box assembly comprising:
   a plurality of terminals, each of the plurality of terminals having a distal end shaped differently from each other;
   a plurality of separating walls and a plurality of eyelet posts, each of the plurality of separating walls is taller than each of the plurality of the eyelet posts; and
   an upper case having an outer wall and a bottom wall, the outer wall and the bottom wall bounding a space for accommodating the electronic components,
   wherein the outer wall extends upwardly from a peripheral edge of the bottom wall, wherein the bottom wall and the outer wall are dimensioned to form a plurality of recesses, each of the plurality of recesses being spaced apart from each other and form a plurality of key features which are different from each other and correspond in shape to one of the plurality of terminals, and wherein the plurality of separating walls includes a pair of end separating walls disposed on the ends of the outer wall and a plurality of intermediate separating walls disposed between the pair of end separating walls, wherein a width of the pair of end separating walls is greater than a width of the intermediate separating walls.

10. The junction box as set forth in claim 9, wherein each of the plurality of key features is shaped to receive the distal end of a corresponding one of the plurality of terminals.

11. The junction box as set forth in claim 9, wherein each of the plurality of separating walls separates the plurality of key features from each other.

12. The junction box as set forth in claim 9, wherein at least one of the plurality of separating walls has a dimension different than the other of the plurality of separating walls.

13. The junction box as set forth in claim 9, wherein at least one of the key features has a width different than the other of the plurality of key features.

14. The junction box as set forth in claim 9, wherein each of the plurality of key features is disposed between a pair of the plurality of separating walls.

15. The junction box as set forth in claim 9, wherein each of the plurality of separating walls includes a terminal end, the terminal end of each of the plurality of separating walls being coplanar with each other.

16. The junction box as set forth in claim 9, the junction box includes a lower case having a terminal support portion including a plurality of openings, each of the plurality of openings disposed within a corresponding key features in a position differently than the other.

* * * * *